United States Patent [19]

Brown et al.

[11] Patent Number: 4,677,573

[45] Date of Patent: Jun. 30, 1987

[54] HARDWARE GENERATION OF STYLED VECTORS IN A GRAPHICS SYSTEM

[75] Inventors: Mark W. Brown; Robert E. Dubke, both of Rochester, Minn.; Milton J. Kimmel, Somers, N.Y.

[73] Assignee: International Business Machines Corporation, Armonk, N.Y.

[21] Appl. No.: 610,367

[22] Filed: May 15, 1984

[51] Int. Cl.⁴ .................... G06F 15/31; G09G 1/16
[52] U.S. Cl. ................................... 364/521; 340/743; 364/522
[58] Field of Search ............... 364/518, 521, 522; 340/729, 739, 744, 743

[56] References Cited

U.S. PATENT DOCUMENTS

| 2.910,681 | 10/1959 | Mita | 340/743 X |
|---|---|---|---|
| 4,331,955 | 5/1982 | Hansen | 340/739 X |
| 4,371,933 | 2/1983 | Bresenham et al. | 364/300 |
| 4,396,989 | 8/1983 | Fleming et al. | 364/521 |
| 4,458,330 | 7/1984 | Imsand et al. | 364/900 |
| 4,529,978 | 7/1985 | Rupp | 340/739 X |

Primary Examiner—Errol A. Krass
Assistant Examiner—H. R. Herndon
Attorney, Agent, or Firm—J. Michael Anglin

[57] ABSTRACT

Vectors on a graphics display are styled according to a specifiable pattern of on/off segments at the same time that they are drawn on the display by integrating the styling of each pixel on the vector at the same time the location of that same pixel is determined according to Bresenham's algorithm.

12 Claims, 11 Drawing Figures

HARDWARE GENERATION OF STYLED VECTORS IN A GRAPHICS SYSTEM

BACKGROUND OF THE INVENTION

The present invention relates to displaying graphics information in electronic data processing, and more particularly concerns apparatus and methods for efficiently displaying styled vectors or lines.

"Styling" a vector refers to displaying the vector not as a single continuous segment, but as a series or pattern of multiple shorter segments separated by blanked or interrupted portions. The common dotted line is an example of a styled vector, as is a center line having alternating long and short segments. In computer graphics, such vectors are useful not only to represent different types of data, but also to fill closed areas—such as polygons and circular sectors—with line patterns and to achieve additional colors by alternating very small segments of two basic colors. Other applications, such as the creation of bars, pie charts, woven patterns, and specialized cursors, are also possible.

Many conventional graphics units use bit-mapped displays, in which a buffer memory (or even the display itself) holds a two-dimensional matrix of addressable locations representing points or pixels, each location having either a single bit for a monochrome display or multiple bits to specify a number of possible colors. The placement of a vector to be drawn on the display may be specified by the horizontal and vertical locations X1 and Y1 of its beginning point, and by the horizontal and vertical locations X2 and Y2 of its end point. The problem of determining which intermediate pixels fall on this vector can be solved by a widely-used technique called Bresenham's algorithm, defined in J. E. Bresenham, "Algorithm for Computer Control of a Digital Plotter", IBM Systems Journal, Vol. 4, No. 1 (1965), pages 25–30. The algorithm is also described in J. D. Foley and A. Van Dam, Fundamentals of Interactive Computer Graphics (Addison-Wesley, 1982), pages 433-436. Although this algorithm is normally executed in software on a general-purpose data processor, it can be performed in hardware when required for higher speed.

In applications such as bit-map presentation graphics, the use of vector styling requires a great deal of time and/or facilities, even if either or both is done in hardware. Using software-generated styled vectors to fill polygon areas is impractical.

SUMMARY OF THE INVENTION

Styled vectors can be generated at high speed without excessive cost if the styling is intimately combined with point determination according to the known Bresenham algorithm, so that the value or color of every pixel on the vector according to its style specification is determined at the same time the location of that same pixel is determined. Both of these operations are performed concurrently in hardware.

The Bresenham algorithm can be stated as follows. Consider a vector lying in the octant where X2 exceeds X1, Y2 exceeds Y1, and X2−X1 exceeds Y2−Y1. First, define the constants:

DELTAX:=X2−X1
DELTAY:=Y2−Y1
E1:=(2*DELTAY)−(2*DELTAX)
E2:=2*DELTAY
EZ :=(2*DELTAY)−DELTAX
X:=X1
Y:=Y1

Then, perform the loop:

FOR I=1 TO DELTAX
 PLOT(X,Y)
 IF EZ IS NOT LESS THAN 0, THEN
  Y:=Y+1
  EZ :=EZ+E1
 ELSE
  EZ:=EZ+E2
 X:=X+1

For a vector in another octant, the variables can be modified to place it in that octant, as shown in Bresenham, op. cit.

Briefly, the above definition of the Bresenham algorithm is modified to allow the efficient execution of styled vectors, by integrating the style definition within the inner loop. At the same time the address of the next point on the vector is determined, the next point on the style definition modifies the appearance of that same point. It is also possible at the same time to modify the point to handle intersections with the previous pixel at that point.

The "style" of a vector is any pattern of distinctive segments into which the vector is divided. Commonly, a style is specified as a repeating pattern of blanked and unblanked segments of various lengths. A center line, for example, could be specified as a cyclic repetition of ten dots on, two dots off, four dots on, and two dots off. More generally, a style might be specified as patterns whose segments are themselves patterns, as sequences of specified colors, and so forth. Also, the invention allows a "style offset" to be specified. This feature is especially useful in filling the interior of an area with a pattern; the pattern can be made independent of slopes and corners in the area boundary, merely by changing the offset of successive vectors to match the slope of the boundary.

The major advantage of the invention is its speed. Generating styled vectors requires no more time than generating ordinary vectors with the Bresenham algorithm. This permits faster generation of more complex images, which in turn opens up a wider field of applications for graphics. For example, fewer long styled vectors can be drawn instead of many short solid vectors. Moreover, the applications programmer is relieved of detailed coding and performance optimization in producing such images. As another example, it now becomes practical to use styled vectors to provide patterned filling of polygon areas. The additional hardware required for vector styling is minimal, and can easily be integrated with the vector-generation hardware.

Other advantages of the invention, as well as modifications within the skill of the art, will become apparent from the following description of a preferred embodiment.

DESCRIPTION OF THE PREFERRED EMBODIMENT

Figure 1:
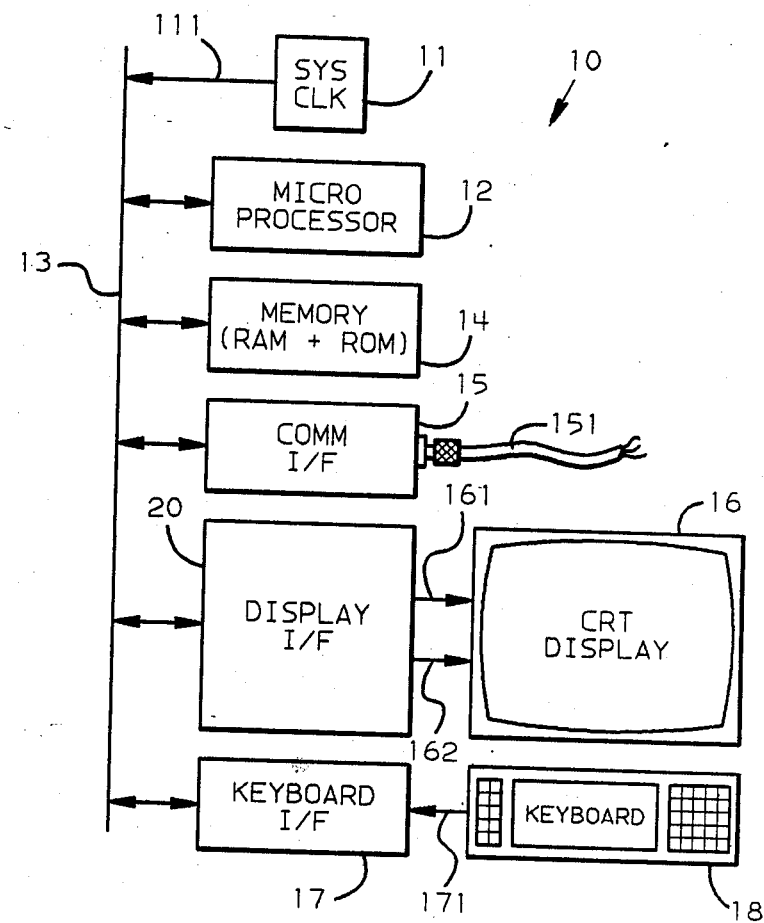
FIG. 1 is a high-level block diagram of a display terminal in which the present invention finds utility.

FIG. 1 shows a data terminal 10 in which the invention may be employed. In its overall organization, terminal 10 is a conventional microprocessor-controlled intelligent terminal capable of displaying both alphanumeric and graphics data transmitted from a host data processor (not shown).

System clock 11 provides one or more fixed clock signals 111 for timing and synchronizing the remaining units of terminal 10. Microprocessor 12 controls the operation of the terminal by means of bus 13 carrying address, data, and control signals. Memory 14 contains read-only memory (ROM) holding fixed operating code and data, and also includes read/write memory (RAM) for variable data and for code downloaded from the host processor. Communications interface 15 manages the communications protocol between the terminal and the host processor via cable 151. Display interface 20 converts data from bus 13 into a video signal 161 acceptable for display on cathode-ray-tube (CRT) display 16. Interface 20 also produces synchronization (sync) signals 162 for timing the raster scan of display 16. Keyboard interface 17 receives signals 171 from keyboard 18 for entering data and operator commands to terminal 10.

Figure 2:
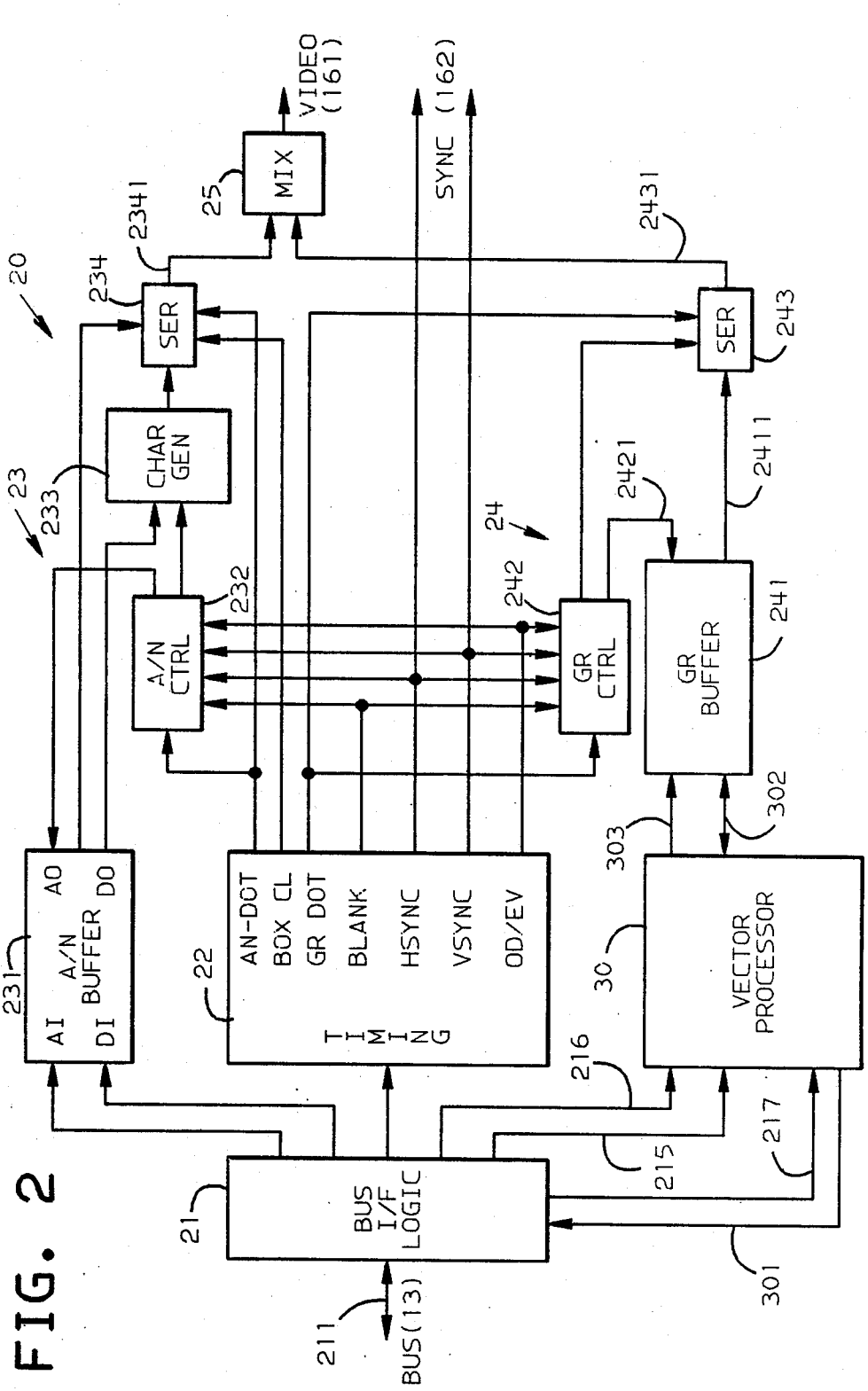
FIG. 2 is a block diagram of the display adapter of FIG. 1.

FIG. 2 shows the major units of display interface 20, most of which are of conventional design, and are more fully described in copending commonly assigned U.S. patent application Ser. No. 602,314, filed April, 1984 by M.W. Brown and R.E. Dubke.

Briefly, bus-interface logic 21 translates the address, data, and control information on lines 211 from bus 13, and communicates it to other blocks within unit 20. Timing unit 22 produces various timing signals for synchronizing the display of alphanumeric (A/N) and graphics data simultaneously as a string of individual dots in a horizontal raster scan across the face of CRT display 16, FIG. 1. Conventional horizontal and vertical sync signals 162 are passed to CRT 16. Alphanumeric (A/N) generator unit 23 produces a video signal representing the images of character codes in the proper sequence for display, using a buffer storage 231, control logic 232, character generator 233, and serializer 234 to produce a serial video signal 2341.

Graphics generator unit 24, comprising blocks 241-243 and 30, produces a video signal 2431 representing the pixels or image elements of a bit-mapped graphics image in the proper sequence for display. Graphics buffer 241 is an addressable read/write memory which receives groups of individual pixels on data-input lines 302 and stores them at addresses specified by address-input lines 303. Graphics control logic 242 supplies a sequence of addresses on lines 2421 to read out the pixels in buffer 241 in the proper order on data-output lines 2411. To provide color graphics, lines 2411 have three sets of sixteen lines each, representing eight different color values of each of sixteen consecutive pixels in a horizontal line. Serializer 243 converts the parallel bits on lines 2411 into serial video signals 2431. Mixer 25 then combines the A/N and graphics serial video signals 2341 and 2431 into a common serial video output 161 for CRT display 16, FIG. 1.

The present invention resides in vector processor 30. Rather than inputting the color value of each specific pixel directly from bus 13 through interface 21 into buffer 241, lines 215 and 216 now specify entire vectors, by means of certain parameters: their beginning and ending locations, their style patterns and style offset values, and the way in which they are to interact with other pixels they may overlie. Color values are specified as well. When bus interface 21 has transferred the parameters for one vector into processor 30, a START pulse on line 217 causes processor 30 to access data words on lines 302 from graphics buffer 241 representing groups of pixels, ascertain which bits of the accessed words belong to the vector pixels and modify them accordingly, then rewrite the data word back to buffer 241. The addresses of these data words are generated by processor 30 and sent to buffer 241 on lines 303. When this has been completed, processor 30 transmits an END pulse 301 back to bus interface 21, allowing it to begin sending data for another vector, if any are available. Concurrently with the above operations, graphics controller 242 reads out pixel color values from buffer 241 in the sequence necessary to display them on a CRT raster, and refreshes the memory locations of this buffer in a conventional manner to prevent data loss in dynamic RAMs.

Figure 3:
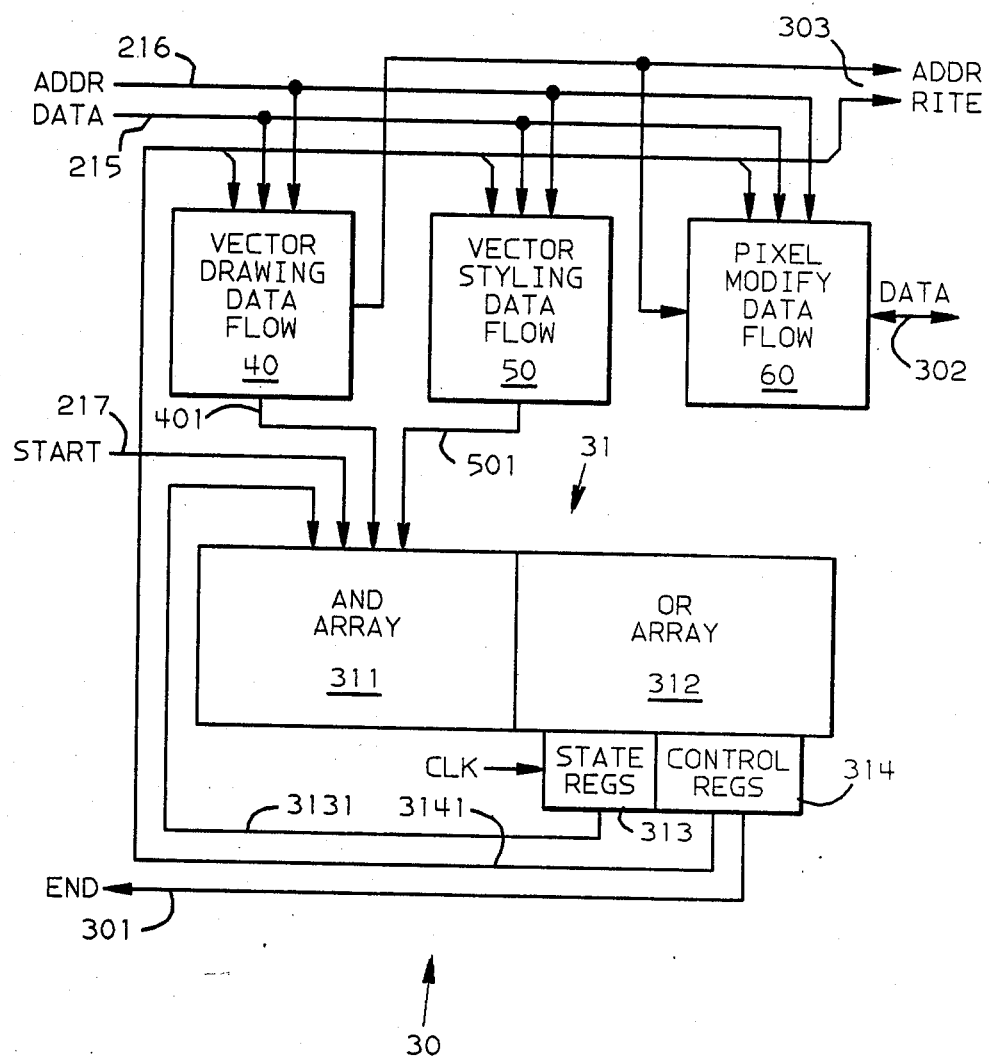
FIG. 3 is a block diagram of the vector processor of FIG. 2.

FIG. 3 shows the major functional units of vector processor 30. Data-flow blocks 40, 50, and 60 comprise registers, gating logic and arithmetic units. The interconnection and operation of this hardware is controlled by a programmed logic array (PLA) 31. Briefly, a PLA has an AND array for forming product terms of multiple inputs, an OR array for combining those product terms into output signals, and a set of clocked registers for latching the outputs. A PLA is equivalent to a set of two-level AND/OR random logic gates. It operates in cycles defined by a clock, and some of the output signals are usually fed back to the inputs to define sequences of states. The AND array 311 of PLA 31 receives inputs 3131 defining the current state, START signal 217, and condition signals 401 and 501 indicating certain results occurring in the data-flow blocks 40 and 50. State registers 313 hold certain outputs of OR array 312 for defining the current state of the PLA on lines 3131. Control registers 314 latch other OR-array outputs as control signals 3141, which control the hardware of blocks 40, 50, and 60. END signal 301 is also output from one bit of register 314. Clocking signal CLK for registers 313 and 314 may be obtained from any convenient source, such as graphics controller 242, FIG. 2.

Vector-drawing data-flow hardware 40 receives parameter data 215 specifying the beginning and ending locations of a vector, and loads them into internal registers selected by address lines 216. The purpose of hardware 40 is to produce a sequence of addresses 303 specifying the particular words in graphics buffer 241 which contain pixels belonging to the vector. Vector-styling data-flow hardware 50 receives parameter data concerning the style pattern of the vector, loading them into selected internal registers. Hardware 50 produces condition signals 501 from which PLA 31 generates a blanking control signal BLANK on one of the lines 3141 for use in the pixel-modification data-flow hardware 60. Pixel data-flow hardware 60 receives parameters specifying the manner in which the present vector is to interact with any other pixel it may overlie. Its major purpose relative to the invention, however, is to receive pixel data words 302, modify the pixel bits in accordance with the state of the blanking signal for each bit belonging to the vector, and write the modified data back to buffer 241 at the same address. A write-control signal RITE is included in address lines 303.

Figure 4:
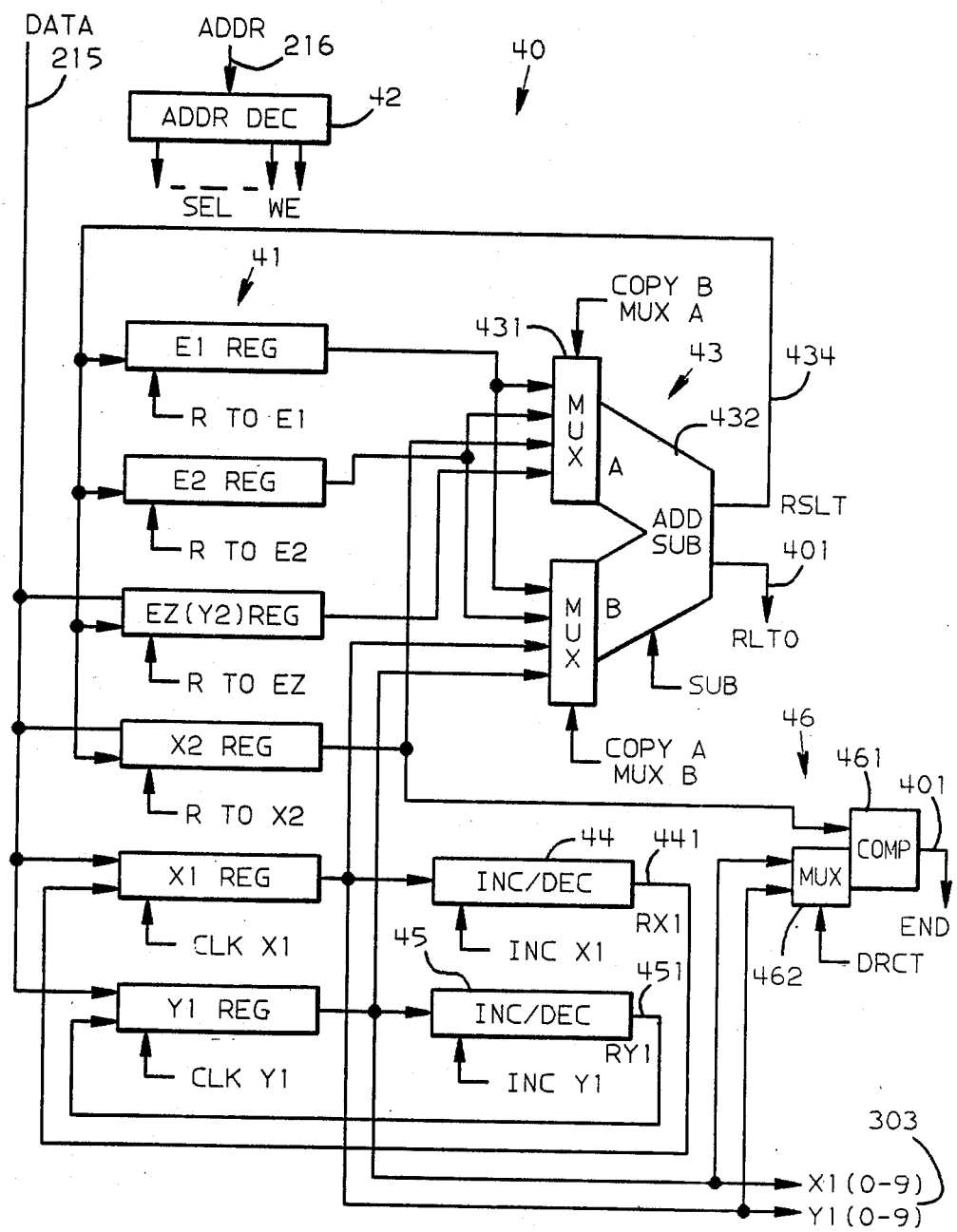
FIG. 4 shows the vector-drawing data-flow hardware of FIG. 3.

FIG. 4 details the drawing data-flow hardware 40. FIG. 4 includes the registers 41 for the basic Bresenham algorithm, each identified by the name of the parameter it stores: E1, E2, EZ, X2, X1, and Y1. The same parallel data 215 is selectively loaded into the EZ (initially loaded with the value of Y2), X2, X1, and Y1 registers 41 under the control of address decoder 42. Decoder 42 produces individual SELect lines to the EZ, X1, X2, and Y1 registers 41, and a write enable WE as in conventional practice. The width of registers 41 depends upon the dimensions of display buffer 241; if this width is greater than the width of data bus 215, the registers can be loaded in multiple cycles.

Operations are carried out upon the contents of registers 41 in arithmetic units (AU) 43-46. AU 43 has a multiplexer 431 for gating any of the registers E1, E2, X2, and EZ to one side of adder/subtractor 432, in response to the PLA control signals 3141 (FIG. 3) named MUXA in FIG. 4; also, COPYB forces zeros into the "A" side of adder/subtracter 432, so its "B" input merely passes to its output 434. Similarly, multiplexer 433 uses MUXB to gate registers E1, E2, X1, and Y1 to the other side of adder/subtractor 432; COPYA allows the "A" input to pass directly to output 434. Control signal SUB determines whether the result lines 434 represent the sum or the difference of the two inputs. Unit 432 also produces a condition signal RLTO, whose state indicates whether or not the AU result is less than zero; this signal is sent to PLA 31 over one of the lines 401. The result 434 can be gated into any of the E1, E2, EZ, and X2 registers 41 respectively by means of PLA control signals labelled RTOE1 ("result to E1"), RTOE2, RTOEZ, and RTOX2. AU 44 is an incrementer/decrementer, whose output lines 441 represent either one greater or one less than its input, depending upon the state of PLA control signal INCX1. Lines 441 are or are not gated back into register X1 in response to control signal CLKX1. Similarly, AU 45 is an incrementer/decrementer controlled by signal INCY1, whose output 451 can be returned to register Y1 by signal CLKY1. AU 46 has a comparator 461 for comparing the contents of the X2 register with either The X1 or the Y1 register, via multiplexer 462. Control signal DRCT selects between X1 and Y1 depending upon the octant in which the vector lies. If X2 is equal to the output of multiplexer 462, END is sent over a line 401 to inform PLA 31 that the end of the vector has been reached.

Figure 5:
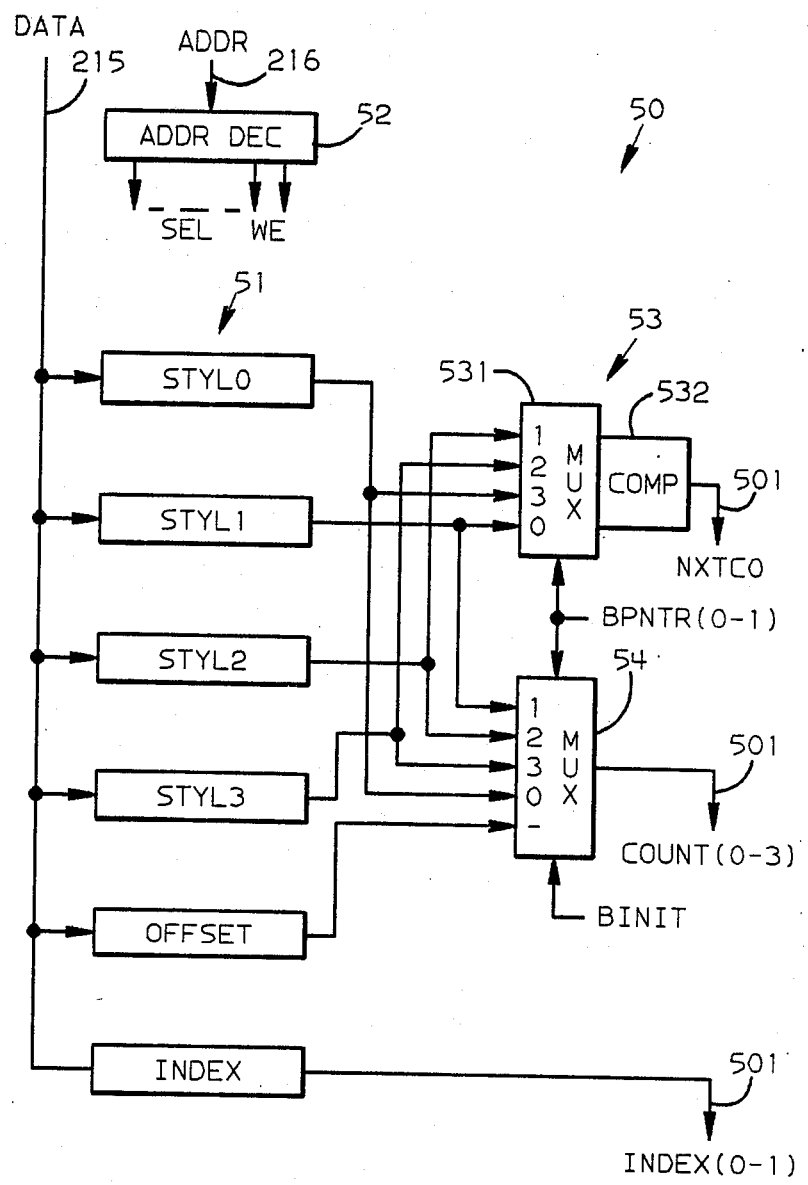
FIG. 5 shows the vector-styling data-flow hardware of FIG. 3.

The X1 and Y1 registers always contain the address of the current pixel to be modified. Therefore, their contents are output on lines 303. The exact form of this output depends upon the organization of the image in graphics buffer 241, FIG. 2. In the present embodiment, the X addresses increase from left to right along each horizontal scan line, the Y addresses increase from bottom scan line to the top scan line, and each addressable word holds 16 pixels. The address actually passed to lines 303 is thus all ten bits of Y1 as the high-order address bits, followed by the high-order six bits of the ten-bit X1 value. The low-order four bits of Y1 are used only by the pixel data-flow hardware 60 to select among the sixteen pixels of a word from buffer 241. FIG. 5 details the data-flow hardware 50 for specifying the style of the vector to be drawn. In the present embodiment, the style pattern is expressed as a set of six parameters:

(1) STYL0, a four-bit code specifying how many consecutive pixels are to be unblanked—i.e., are to be turned on in the display;

(2) STYL1, a second four-bit code specifying how many consecutive pixels are to be blanked—i.e., turned off in the display—subsequent to the vector segment defined by the preceding parameter;

(3) STYL2, a third four-bit code specifying how many consecutive pixels are to be unblanked following the segment defined by the preceding parameter;

(4) STYL3, a fourth four-bit code specifying how many consecutive pixels are to be blanked following the segment defined by the preceding paramenter;

(5) INDEX, a two-bit code specifying which of the four segments defined in STYL0-STYL3 is to be the beginning segment of the vector;

(6) OFFSET, a four-bit code overriding the value of the STYL register pointed to by INDEX, only on the first instance of the beginning segment.

A standard center line, for example, could be defined as a segment of ten bits on (unblanked), followed by two bits off (blanked), then four bits on, then two bits off. If we wish to begin at the 14th bit of the pattern, we would point to register STYL2 with INDEX=2 and set OFFSET=3. Registers STYL0-STYL3 would be set to: 10, 2, 4, 2 respectively. This creates a pattern of 3 on, 2 off, 10 on, 2 off, 4 on, 2 off, then repeating 10, 2, 4, 2, until the end of the vector is reached.

Each register 51 receives parallel data on certain bits of lines 215. The particular register to be loaded is determined by address lines 216, acting through decoder 52 to produce SELect signals and a write enable WE. The registers named STYL0-STYL3 are four-bit parallel registers, and their outputs are selectively input to zero detector 53 by two PLA control bits labelled BPNTR(0-1) ("blanking pointer") acting on multiplexer 531. The selected output is compared to zero by comparator 532, which can be a four-input NOR gate. Output signal NXTCO, sent to PLA 31 over a line 501, is on when a zero is detected. These same register outputs can be selectively gated through multiplexer 54 by BPNTR to a four-bit output signal COUNT(0-3), which goes to PLA 31 on lines 501 to be loaded into a counter in PLA 31 and there counted down as each pixel is processed. The two inputs to the multiplexers are offset from each other, so that, when STYL(n) is gated through 54, STYL(n+1), modulo four, is gated through 53. Multiplexer 54 has an additional input from the OFFSET register, which can be gated out by the BINIT ("blanking initialize") control signal, thus allowing the contents of OFFSET to be substituted for any of the STYL registers. The register named INDEX is only two bits wide, and its output goes directly to PLA 31 as control signal INDEX on two lines 501. Note that registers 51 do not change during the processing of one vector; that is, they always hold initial values of the style parameters.

Figure 6:
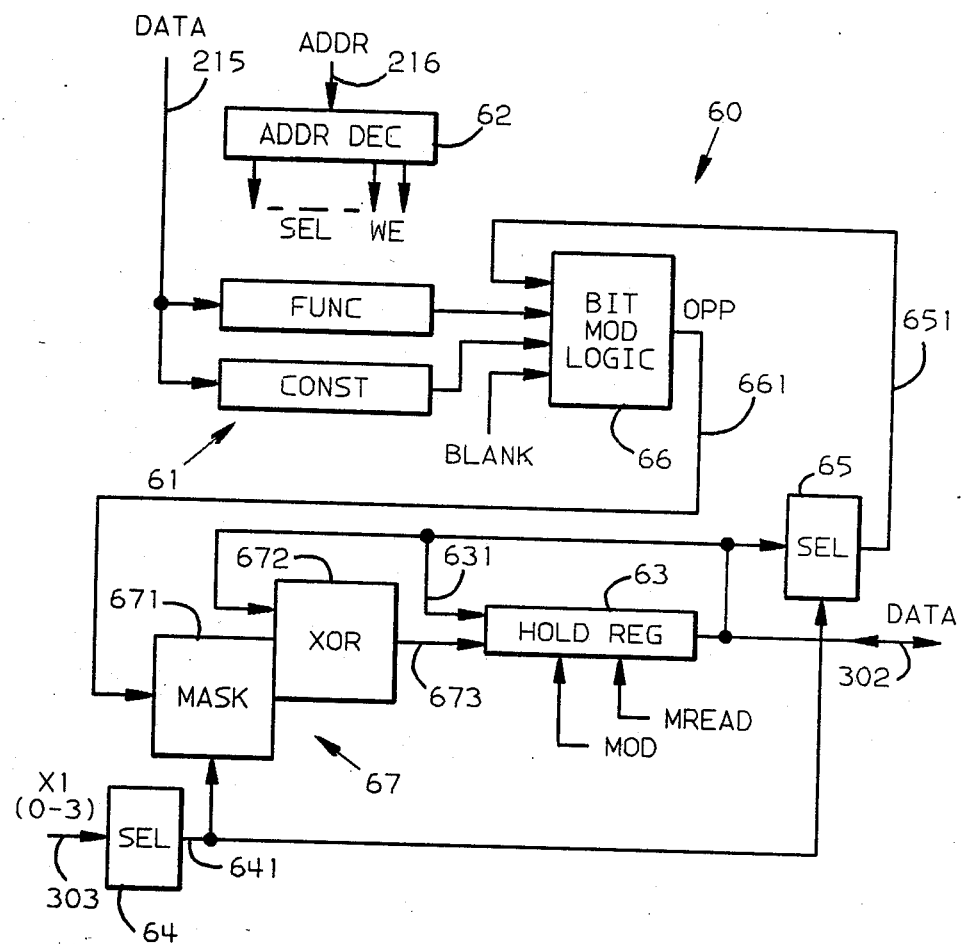
FIG. 6 is the pixel-modification data-flow hardware of FIG. 3.

FIG. 6 details the pixel modification data-flow hardware 60 of FIG. 3. This hardware is actually replicated as many times as there are bits in each pixel—in the present embodiment, three times. Two parameters, a 2-bit function designation and three 1-bit constants, are loaded into registers 61 from data bus 215, by means of address decoder 62 operating from bits of address lines 216 and generating write enable WE. The significance of the function and constant parameters is as follows. If FUNC contains a "00" value, the current bit is ANDed with the complement of the CONST value; if FUNC contains "01", the current bit is ORed with the CONST value; for "10", these bits are XORed; and for "11", the current bit is set to the value of CONST. Since hardware 60 has three replications or planes, the entire CONST parameter has three bits, one for each color. That is, CONST determines the color of the intersection of the current vector with any previous pixels. Each plane of register 63 contains one of the three bits of the current word (in all, sixteen pixels of three bits each) from buffer 241, FIG. 2. This word is addressed by bits Y9–Y0 and X9–X4 of lines 303 and read in over lines 302, as illustrated in FIG. 3. Loading a new new word via lines 631 is enabled by PLA control signal MREAD. Since the contents of register 63 always appear on lines 302, the current word can be written back into buffer 241 at any time by another PLA control signal, RITE, FIG. 3, operating on buffer 241. Each plane of hardware 60 operates upon only a single bit of the current word at a time. Address decoder 64 selects this bit from the sixteen bits of register 63 by producing a selection signal 641 in response to the low-order four bits of the X1 address 303, from drawing data-flow hardware 40, FIG. 4. That is, only those bits of the current word which belong to some portion of the vector are selected; the remaining bits of the current word are not processed at all by hardware 60. Selector 65 then gates the appropriate bit from register 63 over line 651 to bit-modification logic 66, which produces a signal 661 labelled OPPosite, whose value indicates whether or not the selected bit is to be inverted. Logic 66 is enabled by the BLANK control signal from PLA 31. If BLANK is on, OPP is always off; that is, no change is made to any pixel located in a vector segment which is blanked according to the style definition. If BLANK is off, OPP is a function of the current bit 651, the function designation in the FUNC register 61, and the bit in CONST register 61. The exact logic of block 66 is as follows:

| BLANK Bit | Current Bit 651 | FUNC Reg 61 | CONST Reg 61 | OPP Bit 661 |
|---|---|---|---|---|
| 1 | X | X | X | 0 |
| 0 | 1 | 00 | 1 | 1 |
| 0 | 1 | 00 | 0 | 0 |
| 0 | 0 | 00 | 1 | 0 |
| 0 | 0 | 00 | 0 | 0 |
| 0 | 0 | 01 | 1 | 1 |
| 0 | 1 | 01 | 1 | 0 |
| 0 | 0 | 01 | 0 | 0 |
| 0 | 1 | 01 | 0 | 0 |
| 0 | 0 | 10 | 1 | 1 |
| 0 | 1 | 10 | 1 | 1 |
| 0 | 0 | 10 | 0 | 0 |
| 0 | 1 | 10 | 0 | 0 |
| 0 | 0 | 11 | 1 | 1 |
| 0 | 1 | 11 | 0 | 1 |
| 0 | 0 | 11 | 0 | 0 |
| 0 | 1 | 11 | 1 | 0 |

Reload logic 67 produces a new current word, having the modified bit in the correct position. Conventional mask logic 671 inserts bit 661 into the position specified by the four X1 address bits on 641, and inserts zeros into all other fifteen locations. Thus exclusive(XOR) logic 672, whose other input is the 16-bit current word, produces a new 16-bit current word 673 in which only the selected bit is changed or not, depending upon the state of signal 661. Control signal MOD (modify) then reloads this word into register 63. When all the revelant bits of the current word have been processed, another PLA control signal rewrites the word into buffer 241, as will be described.

Figure 7:
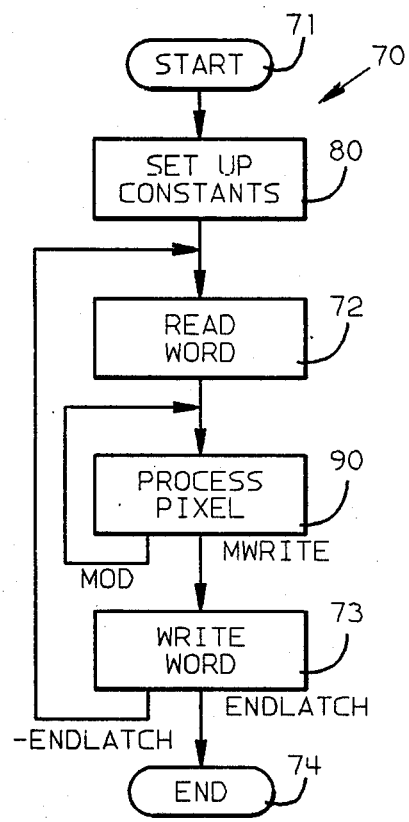
FIG. 7 is a high-level sequence diagram for generating vectors with the hardware of FIG. 3.

FIG. 7 is a high-level sequence diagram of the steps 70 executed by units 40–60 under the control of PLA 31, FIG. 3, in processing one vector according to the invention. Start step 71 responds to START signal 217. Step 80 sets up and precalculates the values of certain constants used by Bresenham's algorithm and by the style algorithm; this requires a number of PLA cycles. Step 72 then reads a word from buffer 241 into holding register 63 as the current word, from an address determined by lines 303 from drawing hardware 40. This requires two PLA cycles, plus possible memory-wait cycles. Step 90 then processes one selected pixel of the current word by sending control signals to hardware 40–60. Step 90 requires exactly two PLA cycles to perform all operations upon that bit, regardless of how complex the operations are. Step 90 is repeated for each additional pixel in the current word which belongs to the vector. Whether any such pixels remain to be processed is determined by step 90 at the same time that it operates upon the selected pixel. When all bits of the current word which belong to the vector have been processed, repetition of step 90 is discontinued, and PLA control signal MWRITE enables execution of step 73. This step writes the current word back into graphics buffer 241 in two (plus wait) cycles, and determines whether the end of the vector has been reached. If the end has not been reached, control is returned to step 72, in response to a zero value of a PLA state signal named ENDLATCH. If the end has been reached, a one value in state signal ENDLATCH passes control to step 74. This step emits an END signal 301 to bus interface unit 21, FIG. 2, and awaits a new set of specifications for the next vector.

Figure 8A:
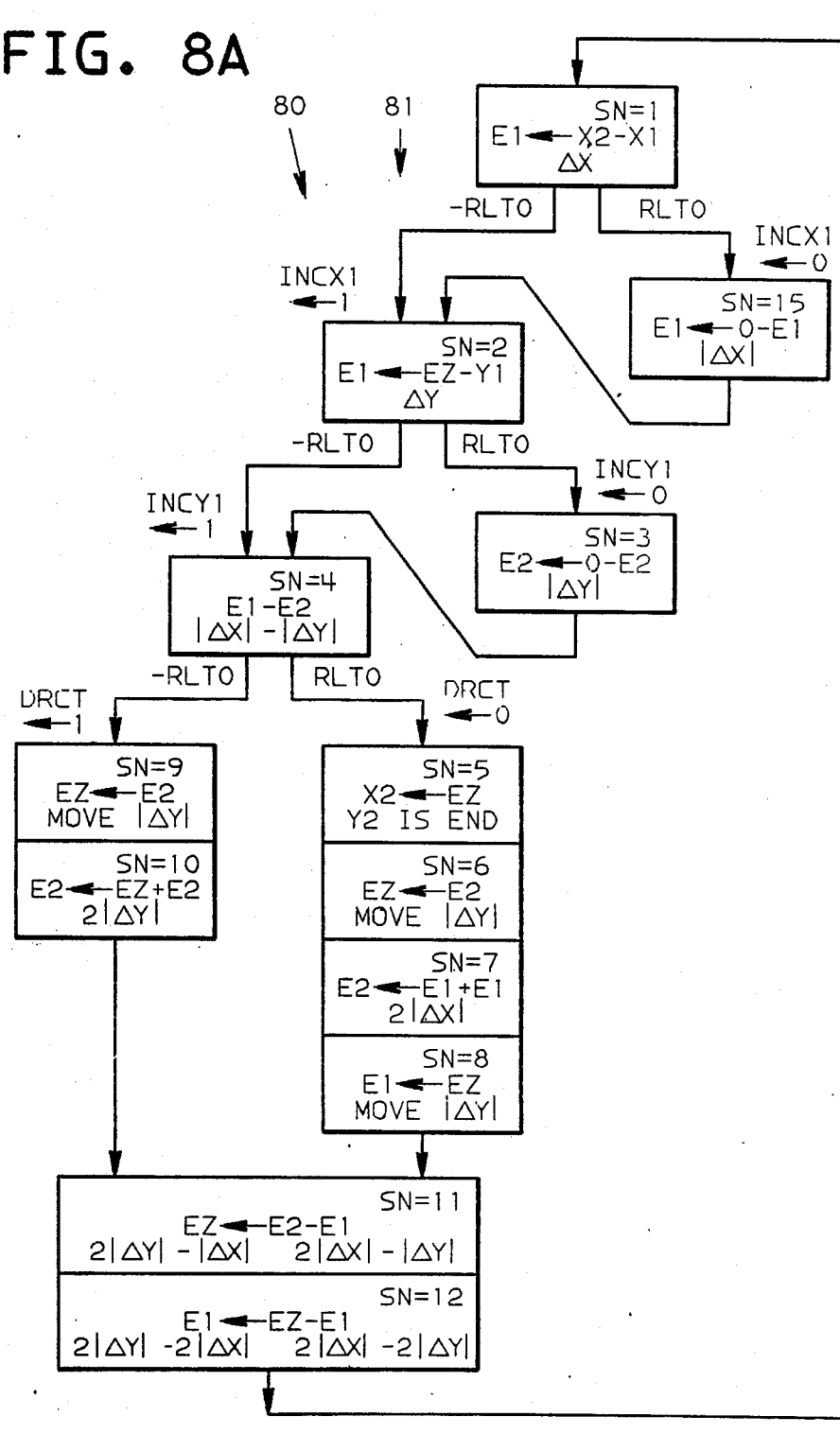
FIGS. 8a and 8b show the parameter-calculation sequence of FIG. 7.
Figure 8B:
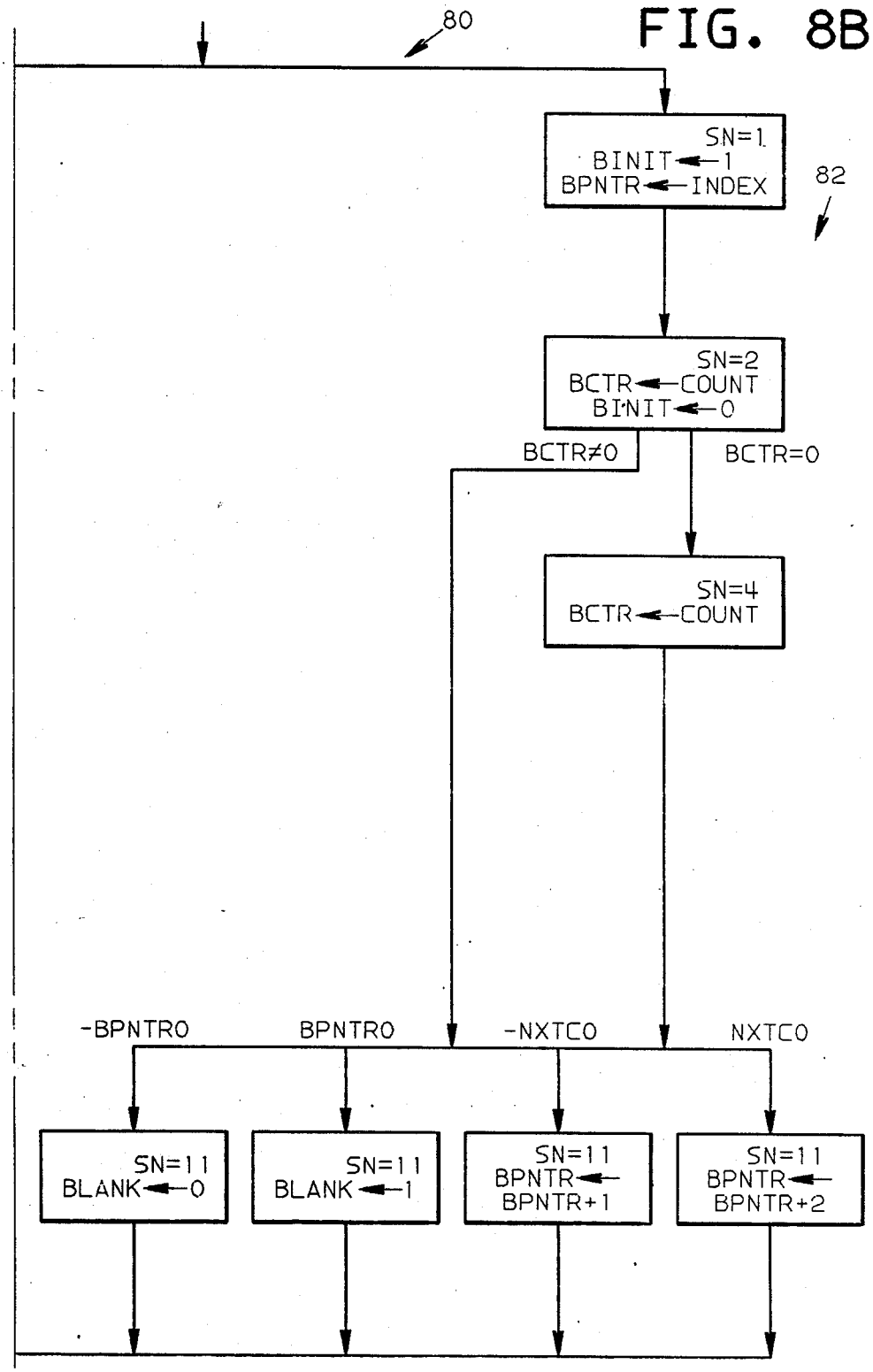

FIG. 8 details sequence 80 of FIG. 7 for setting up certain constants for processing a vector. Sequence 80 actually performs two different functions simultaneously; these are shown schematically as sequences 81 and 82. Each block in FIG. 8 represents one step having two cycles of PLA 31; the details of the individual cycles are not relevant here. The top line in each block contains an (arbitrary) state number represented in PLA state signals 3131. All blocks having the same state number occur simultaneously, whether in the same or different sequences 81 or 82. A legend below a block describes the condition for determining sequence flow to the next block; a legend above the next block shows PLA control bits set as a consequence of that condition.

Sequence 81 precalculates three constants, E1, E2, and EZ for the Bresenham algorithm. It further determines the octant in which the vector lies, so that the algorithm can proceed in the same way for any octant. In sequence 81, the middle line of each block shows the operation performed in AU 43 in terms of registers 41; the actual data flow is determined by the PLA control signals shown in FIG. 4. The bottom line contains a symbolic representation of the result. First, at state SN=1, the difference between the X2 and X1 registers is gated into the E1 register 41. If result DELTAX is greater than or equal to zero (RLTO=0, FIG. 4), the INCX1 control signal is set to one, indicating that the vector lies in an octant running from left to right. If, however, the result DELTAX is less than zero (RLTO=1), the vector runs from right to left, and INCX1 is set to zero. The value of RLTO from SN=1 determines whether SN=2 or SN=15 is the next state. If state SN=15 is entered, (i.e., the right-hand branch is taken after SN=1), then E1 is subtracted from zero in order to make DELTAX positive. In either case, state SN=2 causes the E2 register to receive the difference DELTAY between the EZ and Y1 registers. If this result is less than zero (RLTO=1, the right-hand branch), DELTAY is made positive by subtracting E2 from zero at SN=3, and control signal INCY1 is set to zero, because the vector lies in an octant where the Y coordinate decreases. Otherwise, state SN=4 is entered directly from SN=2, and control signal INCY1 is set to one. In either case, the operation of the SN=4 block subtracts the absolute value of DELTAY from that of DELTAX. If this result is less than zero (RLTO=1), DRCT is set to zero and the operation of block SN=5 moves EZ to X2, to indicate that the vector lies in an octant where the Y2 coordinate, rather than the X2 coordinate, is to indicate that the end of the vector has been reached. DELTAY in register E2 moves to EZ at SN=6, DELTAX is doubled by adding it to itself and gating the result to E2 at SN=7, and DELTAY moves from EZ to E1 at block SN=8.

But, if the left-hand branch (RLTO=0) is taken at SN=4, then DRCT is set to "1", and DELTAY is doubled by moving E2 into EZ at SN=9, then adding E2 to EZ at SN=10. After either SN=10 or SN=8, the next step, SN=11, moves the difference between E2 and E1 to EZ. The quantity in EZ represents one of the required Bresenham constants; its value is either twice DELTAY minus DELTAX, or twice DELTAX minus DELTAY, depending upon the slope of the vector. Finally, at SN=12, the second Bresenham constant is calculated by moving the difference between EZ and E1 into E1. Again, its value represents one of two different quantities, depending upon the vector slope. The third constant, E2, is already in the E2 register.

Sequence 81 has now determined the three Bresenham constants, E1, E2, and EZ. In addition, the X2 register contains the vector end-point address (either X2 or Y2, depending on the octant), and registers X1 and Y1 contain the address of the first pixel to be read from buffer 241. RLTO has been set correctly for the first iteration. Sequence 81 has also determined three bits INCX1, INCY1, and DRCT, indicating which octant contains the vector, according to the following table.

| DRCT | INCX1 | INCY1 | Angle (degrees) |
|------|-------|-------|-----------------|
| 1    | 1     | 1     | 0-45            |
| 0    | 1     | 1     | 45-90           |
| 0    | 0     | 1     | 90-135          |
| 1    | 0     | 1     | 135-180         |
| 1    | 0     | 0     | 180-225         |
| 0    | 0     | 0     | 225-270         |
| 0    | 1     | 0     | 270-315         |
| 1    | 1     | 0     | 315-360         |

Sequence 82 initializes a count value BCTR, a register pointer BPNTR, and the value of the blanking signal BLANK, so that the vector begins at the correct place in the style pattern, as specified by the OFFSET and INDEX registers 51. Sequence 82 uses only those states which are always executed in sequence 81, so no conflict ever arises between them. These states are executed whenever they are reached in sequence 81; all other states of sequence 81 cause no operation to occur in sequence 82.

In block SN=1 of sequence 82, PLA control signal BINIT ("BCTR initialize") is set to one. This passes the 4-bit contents of the OFFSET register 51 through multiplexer 54, to its output COUNT [0-3]. Also, SN=1 causes the 2-bit INDEX register contents to appear as two PLA control bits called BPNTR ("blanking pointer"). Next, during block SN=2, PLA 31 loads the COUNT signals into an internal decrementing counter BCTR ("blanking counter") in the PLA. BINIT is turned off.

At the end of sequence 82, BPNTR selects one of the STYL0-STYL3 registers which represents the initial segment of the vector, and BCTR contains the number of pixels to be drawn in that initial segment (i.e., to replace the contents of that STYL register for the first cycle through the pattern). If the selected STYL register contains zero (BCTR=0), step SN=4 loads BCTR with the full count of the selected STYL register instead; this is a convention that an OFFSET of zero specifies that the initial vector segment should receive the full number of pixels.

Further processing then occurs in the blocks at SN=11. If the low-order bit BPNTR0 of BPNTR is off, the selected STYL register 51 is either STYL0 or STYL2. Since these represent "on" segments of the vector, the blanking control bit BLANK is turned off in the leftmost block of SN=11. Otherwise, if BPNTR0=1, the selected register is STYL1 or STYL3. These correspond to "off" vector segments, so BLANK is turned on in the next SN=11 block. BPNTR causes MUX 53 to point to the next STYL register beyond that specified by MUX 54. If this next STYL register does not contain all zeros, NXTCO=0 from detector 53, and BPNTR is advanced by one (modulo four). On the other hand, NXTCO=1 causes the rightmost SN=11 block to skip the next STYL register, and instead to select the one beyond that, BPNTR+2.

At the end of sequence 82, PLA 31 is set up to draw the first pixel of the vector at the correct place in the style pattern. The contents of OFFSET have been substituted for the selected STYL register in BCTR, and BPNTR points either one or two places beyond the selected register, as will be required in step 90.

Figure 9A:
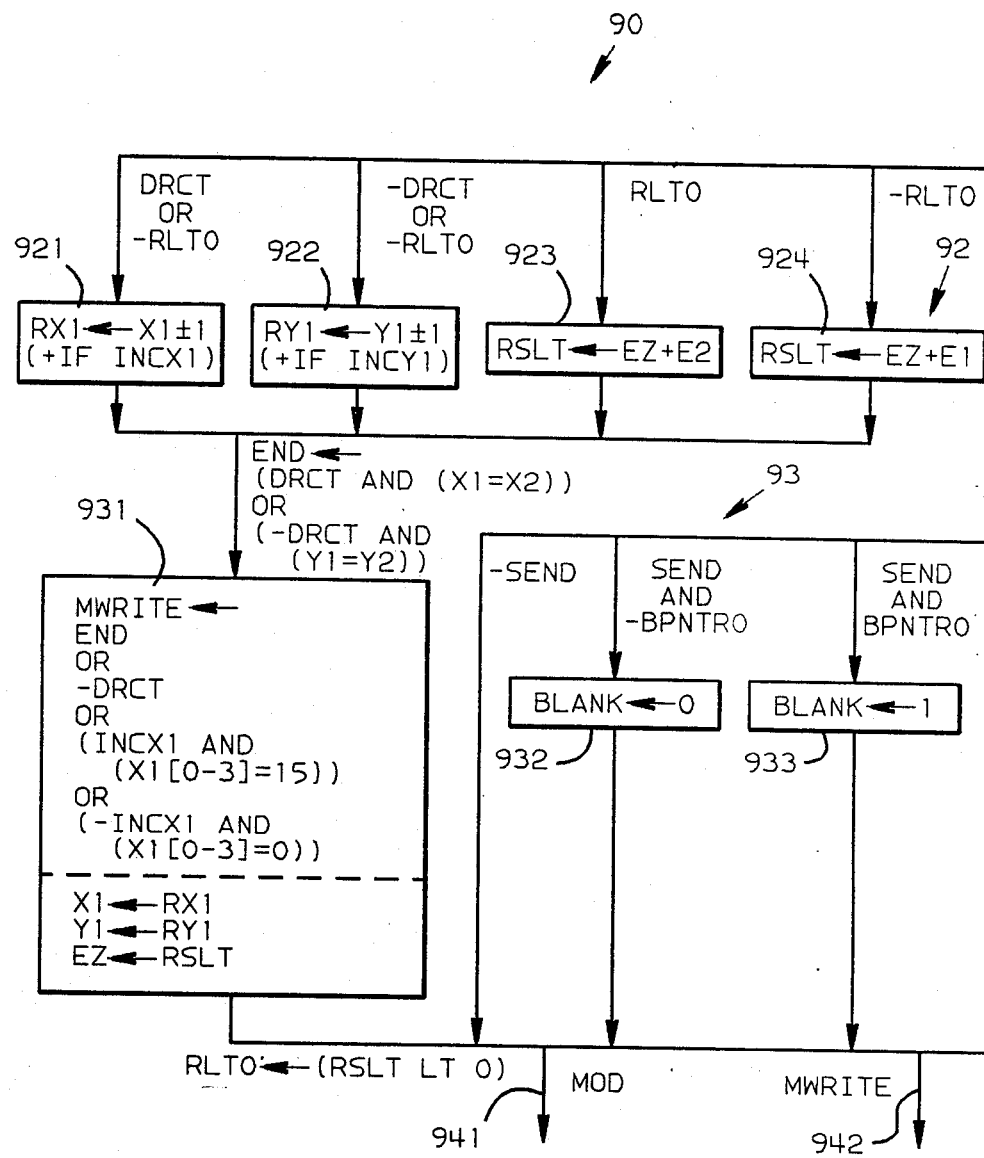
FIGS. 9a and 9b show the pixel-processing cycle of FIG. 7.
Figure 9B:
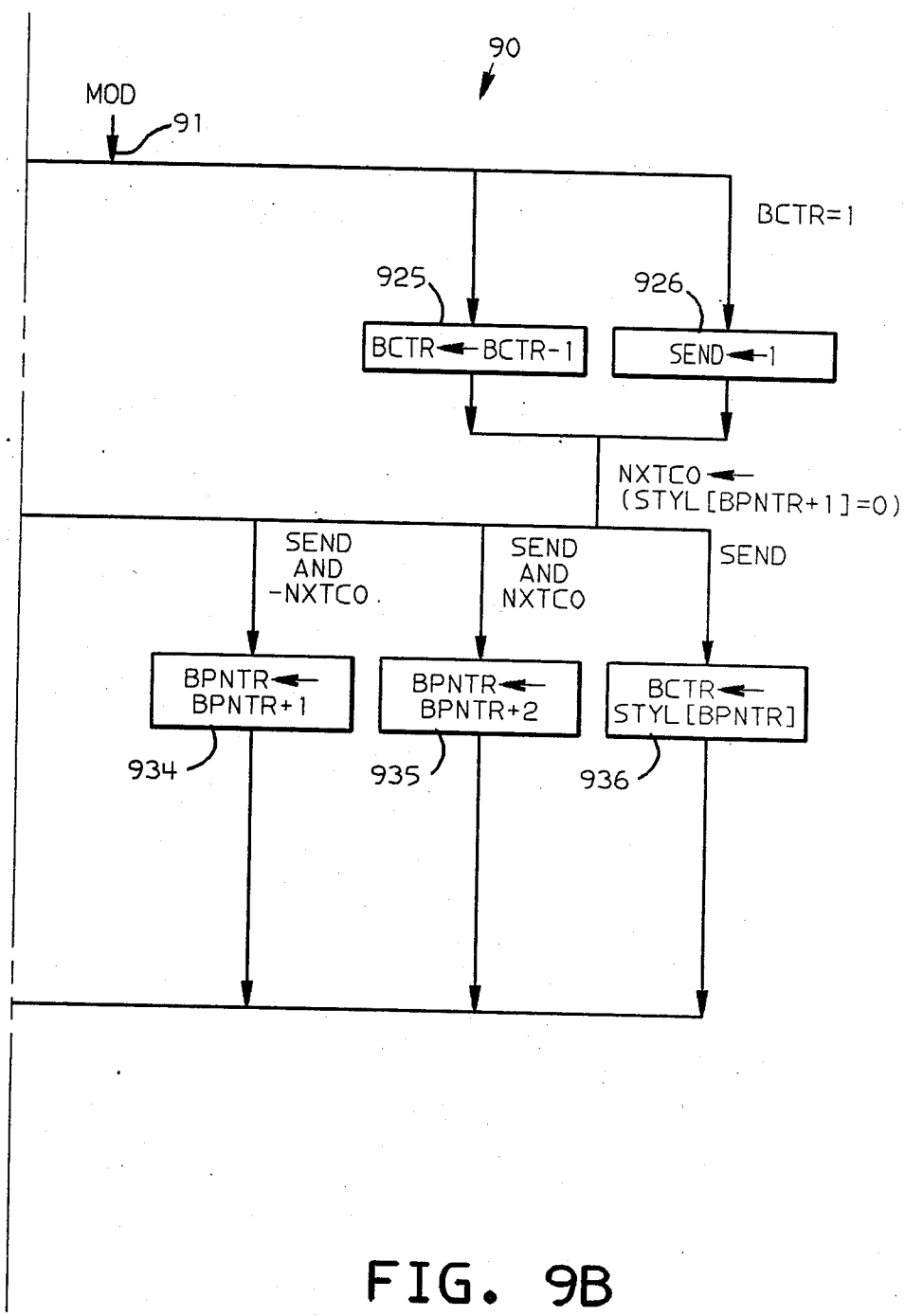

FIG. 9 shows the details of step 90 of FIG. 4 performed under the control of PLA 31 for processing one pixel in holding register 63, FIG. 6, belonging to the vector. That pixel, the current pixel, is the one addressed by the X1 and Y1 registers at the beginning of step 90. (At the end of step 90, X1 and Y1 address the next pixel.) Step 90 performs five separate operations concurrently in order to confer the advantages of the invention:

(1) Determining the location of the next pixel belonging to the vector according to Bresenham's algorithm;

(2) Determining whether or not the next pixel is in the current word in register 63;

(3) Generating the BLANK signal, in accordance with which style segment the next pixel is in, in terms of the style definition parameters;

(4) Determining which style segment the next pixel will be in; and (5) Determining the new value of the current pixel, in terms of the FUNC and CONST parameters.

As shown at entry arrow 91, step 90 is entered whenever the current PLA state is MOD.

During the first PLA cycle 92 of the sequence, blocks 921–924 update the Bresenham algorithm registers 41, FIG. 4, to point to the next pixel to be processed. If the DRCT control signal is on, or if RLTO (the adder/subtracter condition signal indicating whether or not its result is less than zero) is off, the X1 register is incremented (if INCX1=1) or decremented (INCX1=0) in unit AU 44 by block 921. Simultaneously, if DRCT is off or if RLTO is off, block 922 increments (INCY1=1) or decrements (INCY1=0) Y1 in AU 45. The intermediate results RX1 441 and RY1 451 are not reloaded until cycle 93. Meanwhile, AU 43 adds either E2 or E1 to EZ, in block 923 or 924, as RLTO is on or off, to form intermediate result RSLT 434.

Also during cycle 92, blocks 925–926 update the styling algorithm control signals. BCTR holds the number of pixels remaining in the current segment of the style definition. Block 925 decrements this counter, and block 926 sets control signal SEND ("segment end") if the counter contains a "1"—that is, if block 925 will decrement it to zero during this cycle. There are no conditions on the inputs to blocks 925–926; they both occur during every modify step.

The values of several signals developed by the hardware are shown at the end of cycle 92, since they are used by the PLA in cycle 93. END is set by AU 46, FIG. 4, according to the logic equations shown in FIG. 9. The value of NXTCO is set by unit 53, FIG. 5, according to whether or not the STYL register 51 following the current one (addressed by the two bits of BPNTR via multiplexer 531) contains all zeros.

During PLA cycle 93, the MWRITE control signal in block 931 is set to determine whether or not step 90 will be repeated; cf. FIG. 7. MWRITE=1 signifies that the current word in register 63 must be written back to buffer 241. MWRITE is activated if the END of the vector has been reached, or if the next pixel to be processed is not contained in the current word. This latter condition occurs in one of three ways. It occurs if the vector has a slope greater than unity (DRCT=0), since all bits in the current word have the same Y address. Since register 63 holds sixteen pixels, it also occurs if X is incrementing upward (INCX1=1) while the low-order four bits of the X1 register 41 are all on (=15). Finally, it occurs if X is decrementing downward (INCX1=0) while these four bits are all zero. If MWRITE is set in block 931, MOD is implicitly turned off. Block 931 also completes the task of blocks 921–924 by loading RX1, RY1, and RSLT into the X1, Y1, and EZ registers, FIG. 4. At the end of cycle 93, RLTO reflects whether or not RSLT is less than zero.

At the same time during cycle 93, blocks 932–936 complete the style processing for the current pixel. If SEND=0, the current pixel does not lie at the end of a segment, so no operation is performed, and the value of the BLANK bit is not changed. But, if SEND=1, block 932 sets BLANK to zero if the next style counter 51 represents an "on" segment; this is true if the low-order bit of BPNTR is off, indicating that either STYL0 or STYL2 is the counter representing the next segment; otherwise, if the low-order bit of BPNTR is on, STYL1 or STYL3 is next, so block 933 sets BLANK to one for an "off" vector segment. Simultaneously, blocks 934–935 determine which STYL register 51 is to be used for the next segment. If the next register in numerical order, modulo four, does not contain all zeros (NXTCO=0), then block 934 changes the two bits of BPNTR to point to the next higher counter; otherwise, the counter after that is chosen in block 935. That is, a segment counter is allowed to specify that there are zero pixels in a segment. (However, two adjacent zero-length segments are not allowed.) Finally, whenever SEND is true, block 936 loads the PLA counter BCTR with the contents of the STYL register pointed to by BPNTR.

The function of setting the current bit according to the FUNC and CONST parameters is performed—independently of the other operations occurring during cycles 92 and 93—by the pixel-modification data-flow hardware 60, in response to the MOD state signal emitted at those times. At the end of cycle 93, exit 941 returns to entry 91 if MOD remains on, as shown in FIG. 7. If block 931 has activated MWRITE, then exit 942 is taken to step 73, FIG. 7.

Modifications to the above preferred embodiment within the scope of the invention will be obvious to those skilled in the art. Vector processor 30, for example, could be replaced by random logic, depending upon speed requirements of a particular application and capabilities of the available technology. Likewise, the invention could be built as a standalone graphics processor, as a hard-copy device such as a printer, or as a part of a general-purpose data processor, instead of the intelligent alphanumeric/graphics terminal 10. Vector styling could be specified in ways other than segment counts, such as a bit mask or a more complex pattern, or as different colors rather than merely as blanked/unblanked bits. The graphics buffer could be organized in other ways, such as a single pixel per addressable word, or as a square of adjacent pixels in both the X and the Y directions per word. Different color bits or other attribute bits could represent the pixels.

We claim as our invention:

1. A method of producing a styled vector as a sequence of pixels from a matrix of individually addressable locations in a graphics system, comprising the steps of:
   (a) receiving a specification representing particular beginning and ending locations of said vector in said matrix of individually addressable locations;
   (b) receiving a specification of a style pattern for said vector;
   (c) determining the particular location in said matrix of individually addressable locations of an intermediate pixel belonging to said vector;
   (d) determining the value of said intermediate pixel according to said pattern specification; and
   (e) repeating steps (c) and (d) for further intermediate pixels belonging to said vector.

2. The method of claim 1, wherein step (c) is performed according to Bresenham's algorithm.

3. The method of claim 2, wherein steps (c) and (d) are performed simultaneously for each said intermediate pixel.

4. The method of claim 2, wherein said style pattern specification comprises a sequence of blanked and unblanked segments.

5. The method of claim 4, wherein each said segment is specified as having a particular number of pixels.

6. The method of claim 5, wherein step (d) comprises:
(d1) updating a count of the number of pixels remaining in a current one of said segments;
(d2) if said count reaches a limiting value, changing the state of a blanking signal, and loading a count representing the number of pixels in a next of said segments; and
(d3) setting the value of said intermediate pixel in response to said blanking signal.

7. The method of claim 2, wherein the value of said intermediate pixel is further determined in accordance with the current value of said pixel and a further specification pertaining to said vector.

8. The method of claim 7, wherein said further specification is operative to modify the value of said intermediate pixel only during a predetermined portion of said pattern specification.

9. In a graphics system capable of displaying a matrix of individual pixels having different discrete locations in said matrix, apparatus for producing a styled vector as a sequence of said pixels comprising:
a controller;
vector-drawing means responsive to said controller and to a specification of certain of said discrete locations as the beginning and ending pixels of said vector, for designating others of said discrete locations as a sequence of intermediate pixels belonging to said vector; and
vector-styling means responsive to said controller and to a specification of a style pattern for said vector, for determining values for said pixels in said sequence substantially simultaneously with the designation of the locations of respective ones of said intermediate pixels.

10. Apparatus according to claim 9, wherein said controller comprises a programmed logic array.

11. Apparatus according to claim 10, wherein said vector-styling means includes a plurality of registers for holding segment lengths specified for said vector, and multiplexer means for gating said registers cyclically to said controller; and wherein said controller is adapted to produce a blanking signal representing the values of said pixels in response to the contents of said registers.

12. Apparatus according to claim 10, further including pixel-modification means responsive to said vector styling means and to a further specification for said vector, for modifying the values of said intermediate pixels in response to the current values of said pixels, said values produced by said vector-styling means, and said further specification.

* * * * *